United States Patent
Jung et al.

(10) Patent No.: US 11,073,871 B2
(45) Date of Patent: Jul. 27, 2021

(54) ELECTRONIC DEVICE COMPRISING FLEXIBLE HINGE

(71) Applicant: Samsung Electronics Co., Ltd., Gyeonggi-do (KR)

(72) Inventors: Seungho Jung, Gyeonggi-do (KR); Iksang Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/763,077

(22) PCT Filed: Nov. 21, 2018

(86) PCT No.: PCT/KR2018/014381
§ 371 (c)(1),
(2) Date: May 11, 2020

(87) PCT Pub. No.: WO2019/103464
PCT Pub. Date: May 31, 2019

(65) Prior Publication Data
US 2020/0348731 A1    Nov. 5, 2020

(30) Foreign Application Priority Data
Nov. 21, 2017    (KR) .......................... 10-2017-0155639

(51) Int. Cl.
*G06F 1/16*    (2006.01)
(52) U.S. Cl.
CPC ............ *G06F 1/1681* (2013.01); *G06F 1/166* (2013.01); *G06F 1/1628* (2013.01)
(58) Field of Classification Search
CPC combination set(s) only.
See application file for complete search history.

(56) References Cited

U.S. PATENT DOCUMENTS 6,700,775 B1 *    3/2004    Chuang ................. G06F 1/1626
                                                    361/679.01
8,143,982 B1    3/2012    Lauder et al.
(Continued)

FOREIGN PATENT DOCUMENTS

KR    10-2014-0128774 A    11/2014
KR    10-2015-0071091 A    6/2015
(Continued)

OTHER PUBLICATIONS

European Search Report dated Nov. 27, 2020.

*Primary Examiner* — Lisa Lea-Edmonds
(74) *Attorney, Agent, or Firm* — Cha & Reiter, LLC

(57) ABSTRACT

Disclosed is an electronic device comprising: a housing comprising an upper plate part portion and a lower plate part portion; and a flexible hinge connecting the upper plate part portion and the lower plate part portion. The upper plate part portion comprises a first surface facing in a first direction, a second surface facing in a second direction that is opposite to the first direction, and a third surface partially surrounding the space between the first surface and the second surface. The lower plate part portion comprises a fourth surface facing in the first direction, a fifth surface lacing in the second direction, and a sixth surface partially surrounding the space between the fourth surface and the fifth surface. The fourth surface faces the second surface of the upper plate part portion in a first state. The flexible hinge comprises: a first segmented portion having a first magnetic body arranged therein, the first magnetic body having a magneticity equal to or larger than a first designated magnitude, the first segmented port ion being made of a first material having a strength equal to or larger than a second designated magnitude, a second segmented portion having a second magnetic body arranged therein, the second magnetic body having a magneticity equal to or larger than a third desig- (Continued)

nated magnitude, the second segmented portion being made of a second material having a strength equal to or larger than a fourth designated magnitude; and a cover portion at least partially surrounding the first segmented portion and the second segmented portion, the cover portion being made of a third material having a strength below a designated fifth magnitude. When changing from the first state to a second state, the first magnetic body and the second magnetic body bind the first segmented portion and the second segmented portion in a substantially straight type. In the second state, the upper plate part portion is cradled on the lower plate part portion while forming a first designated angle with the lower plate part portion. Besides, various embodiments inferable from the specification are possible.

15 Claims, 12 Drawing Sheets

(56) References Cited

U.S. PATENT DOCUMENTS

| | | | |
|---|---|---|---|
| 8,242,868 B2 | 8/2012 | Lauder et al. | |
| 8,508,924 B2* | 8/2013 | Guo | G06F 1/1616 |
| | | | 361/679.09 |
| 8,777,175 B2* | 7/2014 | Wu | G06F 1/166 |
| | | | 248/346.06 |
| 8,953,310 B2 | 2/2015 | Smith et al. | |
| 8,988,876 B2 | 3/2015 | Corbin et al. | |
| 9,035,872 B2 | 5/2015 | Brown et al. | |
| 9,110,631 B2 | 8/2015 | Oakley | |
| 9,304,553 B2 | 4/2016 | Park et al. | |
| 9,442,519 B2 | 9/2016 | Shin et al. | |
| 9,575,555 B2 | 2/2017 | Smith et al. | |
| 9,740,238 B2* | 8/2017 | Han | G06F 1/1683 |
| 9,778,684 B2* | 10/2017 | Senatori | G06F 1/162 |
| 9,778,703 B2* | 10/2017 | Senatori | G06F 1/1679 |
| 9,857,831 B2* | 1/2018 | Senatori | G06F 1/162 |
| 9,918,545 B2* | 3/2018 | van Hooft | F16B 1/00 |
| 10,013,029 B2* | 7/2018 | Senatori | G06F 1/162 |
| 10,114,423 B2* | 10/2018 | Sharma | G06F 1/1626 |
| 2012/0300381 A1* | 11/2012 | Hung | G06F 1/1632 |
| | | | 361/679.09 |
| 2013/0088826 A1* | 4/2013 | Kim | G06F 1/1669 |
| | | | 361/679.09 |
| 2013/0214661 A1 | 8/2013 | McBroom | |
| 2013/0328917 A1 | 12/2013 | Zambetti et al. | |
| 2014/0011548 A1 | 1/2014 | Valera et al. | |
| 2014/0049911 A1 | 2/2014 | Corbin et al. | |
| 2014/0071607 A1* | 3/2014 | Frinak | G06F 1/1628 |
| | | | 361/679.09 |
| 2014/0139989 A1* | 5/2014 | Mori | G06F 1/1626 |
| | | | 361/679.09 |
| 2014/0185196 A1 | 7/2014 | Oakley | |
| 2014/0321038 A1 | 10/2014 | Park et al. | |
| 2014/0328019 A1 | 11/2014 | Liang et al. | |
| 2015/0153783 A1* | 6/2015 | Corbin | G06F 3/04883 |
| | | | 361/679.09 |
| 2015/0192955 A1* | 7/2015 | Fathollahi | G06F 1/1643 |
| | | | 361/679.09 |
| 2016/0246335 A1* | 8/2016 | Senatori | G06F 1/162 |
| 2016/0252930 A1 | 9/2016 | Senatori et al. | |
| 2017/0192455 A1 | 7/2017 | Kim et al. | |
| 2019/0278329 A1 | 9/2019 | Corbin et al. | |
| 2020/0301480 A1* | 9/2020 | Miller | G06F 1/1681 |

FOREIGN PATENT DOCUMENTS

| | | |
|---|---|---|
| KR | 10-2017-0081536 A | 7/2017 |
| WO | 2013/101030 A1 | 7/2013 |

\* cited by examiner

ELECTRONIC DEVICE COMPRISING FLEXIBLE HINGE

CROSS REFERENCE TO RELATED APPLICATIONS

This application is a National Phase Entry of PCT International Application No. PCT/KR2018/014381, which was filed on Nov. 21, 2018, and claims a priority to Korean Patent Application No. 10-2017-0155639, which was filed on Nov. 21, 2017, the contents of which are incorporated herein by reference.

TECHNICAL FIELD

Embodiments of the disclosure described herein relate to an electronic device including a flexible hinge.

BACKGROUND ART

An electronic device, such as a notebook computer, a tablet PC, or the like, may include a hinge such that the electronic device is folded or unfolded depending on a use environment. For example, the electronic device may include a cylinder type hinge disposed between a display and a keyboard thereof, and a user may rotate the display about the central axis of the hinge within a specified angle range to open/close the display, or mount the display such that the display and the keyboard form a specified angle.

DISCLOSURE

Technical Problem

However, due to the physical size of the hinge, there is difficulty in reducing the overall thickness of the existing electronic device. For example, the electronic device including the cylinder type hinge has a problem in that the overall thickness of the electronic device is increased because the cylinder of the hinge has to have a specified diameter or more.

Embodiments of the disclosure described herein provide an electronic device for mounting a display such that the display forms a specified angle with a functional module, by connecting an upper plate part of a housing in which the display is seated and a lower plate part of the housing in which the functional module is seated, through a flexible hinge.

Technical Solution

An electronic device according to an embodiment of the disclosure includes a housing including an upper plate part and a lower plate part, and a flexible hinge that connects the upper plate part and the lower plate part, in which the upper plate part includes a first surface that faces a first direction, a second surface that faces a second direction opposite to the first direction, and a third surface that partially surrounds a space between the first surface and the second surface, the lower plate part includes a fourth surface that faces the first direction, a fifth surface that faces the second direction, and a sixth surface that partially surrounds a space between the fourth surface and the fifth surface, and in a first state, the fourth surface faces the second surface of the upper plate part. The flexible hinge includes a first section having a first magnetic material disposed therein which has magnetism of a specified first magnitude or more, the first section being formed of a first material having strength of a specified second magnitude or more, a second section having a second magnetic material disposed therein which has magnetism of a specified third magnitude or more, the second section being formed of a second material having strength of a specified fourth magnitude or more, and a cover that at least partially surrounds the first section and the second section and that is formed of a third material having strength of less than a specified fifth magnitude. When changed from the first state to a second state, the first magnetic material and the second magnetic material fasten the first section and the second section in the form of a substantially straight line, and in the second state, the upper plate part is mounted on the lower plate part while forming a specified first angle with the lower plate part.

Advantageous Effects

According to the embodiments of the disclosure, an ultra-thin electronic device may be implemented by using a flexible hinge.

In addition, the disclosure may provide various effects that are directly or indirectly recognized.

DESCRIPTION OF DRAWINGS

With regard to the description of the drawings, identical or similar reference numerals may be used to refer to identical or similar components.

MODE FOR INVENTION

Figure 1:
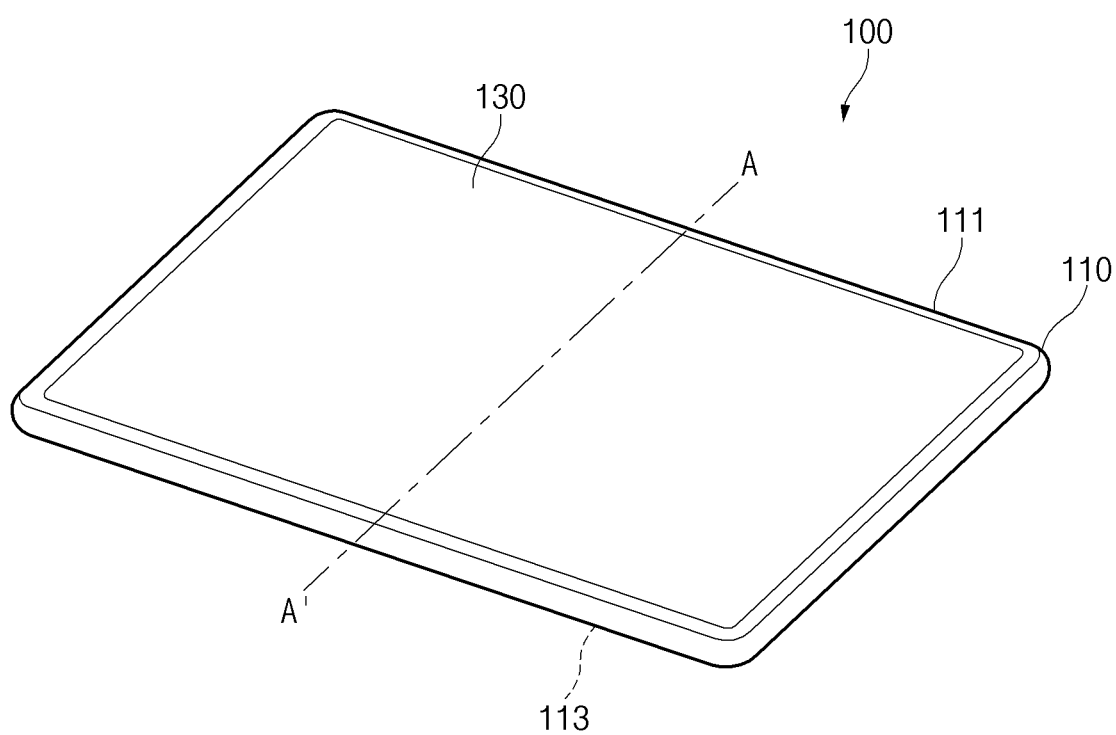
FIG. 1 is a perspective view of an electronic device according to an embodiment.

FIG. 1 is a perspective view of an electronic device according to an embodiment.

Referring to FIG. 1, the electronic device 100 may include a housing 110. The housing 110 may form part of the exterior of the electronic device 100 and may provide a space in which components of the electronic device 100 are seated. According to an embodiment, the housing 110 may be constituted by an upper plate part 111 and a lower plate part 113, and although not illustrated in FIG. 1, the upper plate part 111 and the lower plate part 113 of the housing 110 may be connected together through a flexible hinge (e.g., a flexible hinge 170 of FIG. 2). Although FIG. 1 illustrates a state in which the upper plate part 111 and the lower plate part 113 of the housing 110 are superimposed on each other (or, a state in which the upper plate part 111 and the lower plate part 113 are parallel to each other), the upper plate part 111 and the lower plate part 113 of the housing 110 may be separated from each other through hinge motion of the flexible hinge to form a specified angle.

According to an embodiment, a display 130 may be seated in the upper plate part 111 of the housing 110. For example, the upper plate part 111 of the housing 110 may include a front surface, a rear surface, and side surfaces partially surrounding a space between the front surface and the rear surface, and the display 130 may be seated in the space in a direction from the front surface to the rear surface. That is, a screen of the display 130 may be exposed to the outside when the electronic device 100 is viewed from the front.

According to an embodiment, although not illustrated in FIG. 1, a functional module may be seated in the lower plate part 113 of the housing 110. For example, the lower plate part 113 of the housing 110 may include a front surface, a rear surface, and side surfaces partially surrounding a space between the front surface and the rear surface, and the functional module may be seated in the space in a direction from the front surface to the rear surface. That is, the functional module may be exposed to the outside through the front surface of the lower plate part 113 that is opposite the rear surface of the upper plate part 111. For example, the functional module may include a keyboard, a touch pad, or the like. In another example, a printed circuit board having various types of electronic parts mounted thereon may be disposed inside the lower plate part 113 of the housing 110. For example, at least one electronic element or circuit wire may be mounted on the printed circuit board, and at least some of the electronic parts mounted on the printed circuit board may be electrically connected together. The electronic parts may include, for example, a processor, a memory, communication circuitry, or the like.

Figure 2:
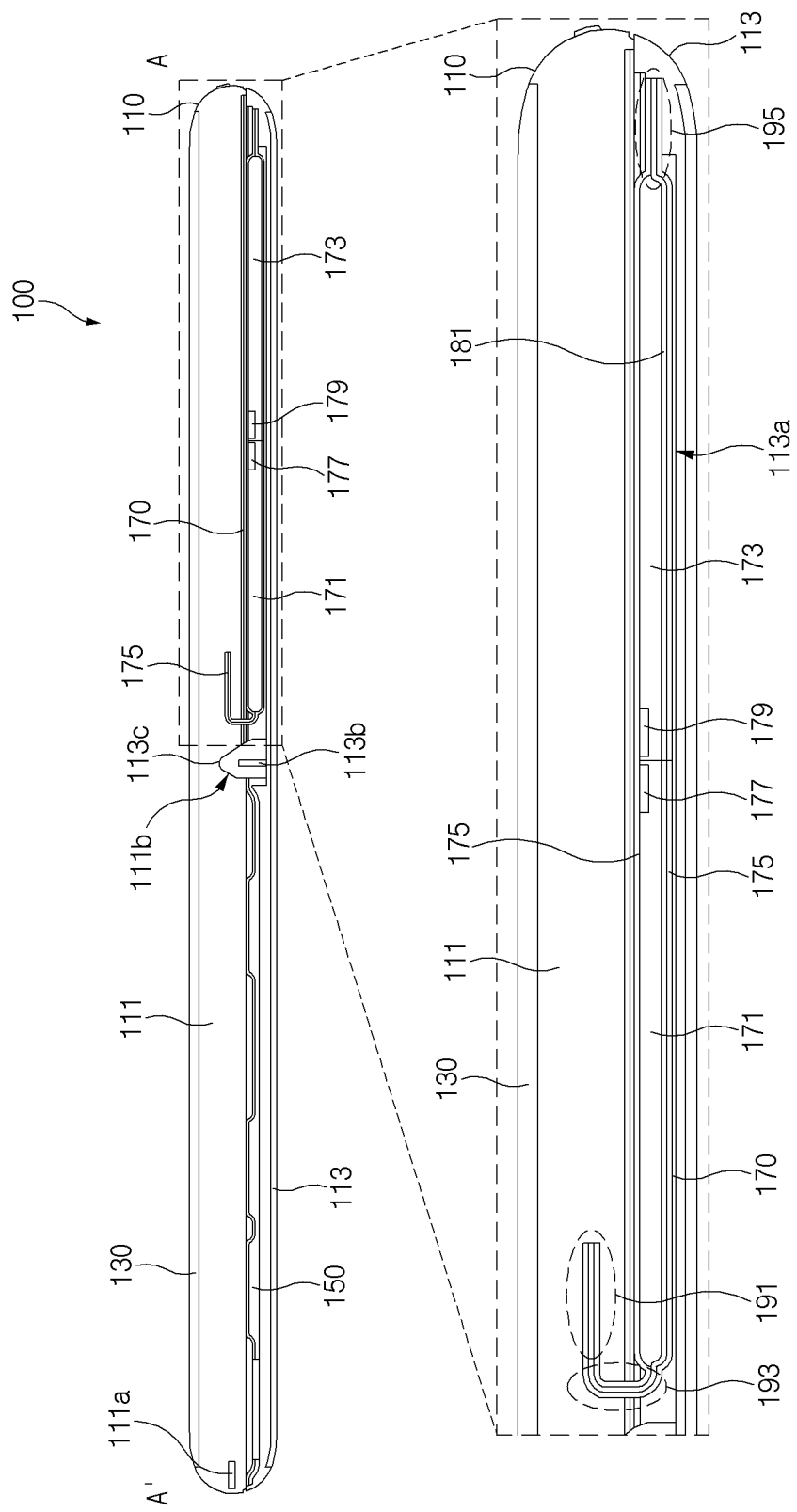
FIG. 2 is a sectional view taken along line A-A' of FIG. 1 according to an embodiment.

FIG. 2 is a sectional view taken along line A-A' of FIG. 1 according to an embodiment.

Referring to FIG. 2, the electronic device 100 may include the housing 110. The housing 110 may be constituted by the upper plate part 111 and the lower plate part 113. The upper plate part 111 and the lower plate part 113 may be superimposed on each other, or may be separated from each other to form a specified angle.

According to an embodiment, the upper plate part 111 and the lower plate part 113 of the housing 110 may be connected together through the flexible hinge 170. For example, a central portion of the upper plate part 111 and one side of the flexible hinge 170 may be connected together, and a peripheral portion of the lower plate part 113 and an opposite side of the flexible hinge 170 may be connected together.

The flexible hinge 170 may include a first section 171, a second section 173, and a cover 175. The first section 171 and the second section 173 may be formed of a material having strength of a specified magnitude or more. According to an embodiment, the first section 171 and the second section 173 may be formed of a thermosetting plastic (e.g., epoxy) material. The cover 175 may surround the first section 171 and the second section 173 and may be formed of a material having strength of less than the specified magnitude. According to an embodiment, the cover 175 may be formed of a material such as urethane, poly urethane, fabric, thermoplastic poly urethane, or the like.

The cover 175 may surround the first section 171 and the second section 173 such that the first section 171 and the second section 173 are not exposed to the outside. According to an embodiment, when the section taken along line A-A' is viewed, the cover 175, as illustrated in FIG. 2, may have a form in which two long straps cover each other, and the first section 171 and the second section 173 may be located between central portions of the long straps. Accordingly, peripheral portions of the cover 175 other than the central portion of the cover 175 in which the first section 171 and the second section 173 are located may be bent due to the nature of the material, that is, a flexible property. For example, a first portion 193 of the cover 175 by which the flexible hinge 170 is connected with the upper plate part 111 of the housing 110 and a second portion 195 of the cover 175 by which the flexible hinge 170 is connected with the lower plate part 113 of the housing 110 may be bent when the flexible hinge 170 performs hinge motion.

A first magnetic material 177 and a second magnetic material 179 that have a magnetic force of a specified magnitude or more may be disposed inside the first section 171 and the second section 173, respectively. The first magnetic material 177 and the second magnetic material 179 may allow the first section 171 and the second section 173 to be fastened with each other in the form of a straight line. According to an embodiment, the first magnetic material 177 may be disposed at a right end of the first section 171, and the second magnetic material 179 may be disposed at a left end of the second section 173. Accordingly, the right end of the first section 171 and the left end of the second section 173 may be fastened with each other due to the magnetism of the first magnetic material 177 and the second magnetic material 179, and the first section 171 and the second section 173 may be disposed in the form of a straight line when taken as a whole. Furthermore, as the first magnetic material 177 and the second magnetic material 179 have a magnetic force of the specified magnitude or more, the first section 171 and the second section 173 may remain fastened with each other as long as external pressure of the specified magnitude or more is not applied thereto. According to an embodiment, at least one of the first magnetic material 177 and the second magnetic material 179 may contain neodymium.

According to an embodiment, a flexible printed circuit board (FPCB) 181 may be disposed inside the cover 175. The flexible printed circuit board 181 may serve to electrically connect the display 130 seated in the upper plate part 111 of the housing 110 and a functional module 150 seated in the lower plate part 113 of the housing 110. For example, the flexible printed circuit board 181 may be electrically connected, at a third portion 191 (e.g., a left end) of the cover 175, with the display 130 seated in the upper plate part 111 of the housing 110 and may be electrically connected, at the second portion 195 (e.g., a right end) of the cover 175, with the functional module 150 seated in the lower plate part 113 of the housing 110. In another embodiment, although not illustrated, the display 130 seated in the upper plate part 111 of the housing 110 and the functional module 150 seated in the lower plate part 113 of the housing 110 may be electrically connected with each other through connectors that are provided inside a depression 111*b* formed on the upper plate part 111 of the housing 110 and a stopper 113*c* formed on the lower plate part 113 of the housing 110. The connectors may include, for example, pogo pins, or the like.

According to an embodiment, the flexible printed circuit board 181 may be disposed to minimize interference by the first magnetic material 177 and the second magnetic material 179 that are disposed inside the first section 171 and the second section 173. For example, when the section taken along line A-A' is viewed, the flexible printed circuit board 181, as illustrated in FIG. 2, may be disposed adjacent to an inner surface of a lower end portion of the cover 175. This is to locate the flexible printed circuit board 181 as far as possible from the first magnetic material 177 and the second magnetic material 179. Furthermore, because the first section 171 and the second section 173 are separated from each other at a portion facing an upper end portion of the cover 175 when the first section 171 and the second section 173 are unfastened, the flexible printed circuit board 181 is preferably disposed adjacent to the inner surface of the lower end portion of the cover 175.

According to an embodiment, a third magnetic material 111a may be disposed in the upper plate part 111 of the housing 110. For example, the third magnetic material 111a may be disposed in a peripheral portion (e.g., a left peripheral portion) of the upper plate part 111 of the housing 110 that is not adjacent to the flexible hinge 170. When the upper plate part 111 of the housing 110 is mounted on the lower plate part 113 while forming a specified angle with the lower plate part 113 of the housing 110, the third magnetic material 111a disposed in the upper plate part 111 of the housing 110 may be fastened with a fourth magnetic material 113b disposed in the lower plate part 113 of the housing 110.

According to an embodiment, the depression 111b may be formed on the upper plate part 111 of the housing 110. For example, the depression 111b may be concavely formed on a central area of the upper plate part 111 of the housing 110 in a direction from the rear surface to the front surface of the upper plate part 111. When the upper plate part 111 of the hinge housing 110 is superimposed on the lower plate part 113 of the housing 110, the stopper 113c formed on the lower plate part 113 of the housing 110 may be inserted into the depression 111b formed on the upper plate part 111 of the housing 110. That is, the depression 111b formed on the upper plate part 111 of the housing 110 may provide a space into which the stopper 113c formed on the lower plate part 113 of the housing 110 is inserted.

According to an embodiment, a seating portion 113a on which the flexible hinge 170 is seated may be formed on the lower plate part 113 of the housing 110. For example, the seating portion 113a may be formed in one direction (e.g., a right direction) with respect to a central portion of the lower plate part 113 of the housing 110. FIG. 2 illustrates a state in which the seating portion 113a is formed on a right area of the lower plate part 133 of the housing 110. For example, the seating portion 113a may be concavely formed in a direction from the front surface to the rear surface of the lower plate part 133 of the housing 110. Accordingly, when the flexible hinge 170 is seated on the seating portion 113a, the surface of the flexible hinge 170 that is exposed to the outside may be placed on almost the same plane as the front surface of the lower plate part 113 of the housing 110. That is, when the upper plate part 111 and the lower plate part 113 of the housing 110 are superimposed on each other, the flexible hinge 170 may be seated on the seating portion 113a, and thus the upper plate part 111 and the lower plate part 113 of the housing 110 may be brought into close contact with each other.

According to an embodiment, the fourth magnetic material 113b may be disposed in the lower plate part 113 of the housing 113. For example, the fourth magnetic material 113b may be disposed in a central area of the lower plate part 111 of the housing 110. When the upper plate part 111 of the housing 110 is mounted on the lower plate part 113 while forming a specified angle with the lower plate part 113 of the housing 110, the fourth magnetic material 113b disposed in the lower plate part 113 of the housing 110 may be fastened with the third magnetic material 111a disposed in the upper plate part 111 of the housing 110.

According to an embodiment, the stopper 113c may be formed on the lower plate part 113 of the housing 110. For example, the stopper 113c may be formed on the central area of the lower plate part 113 of the housing 110 in a shape protruding from the front surface of the lower plate part 113. When the upper plate part 111 of the hinge housing 110 is superimposed on the lower plate part 113 of the housing 110, the stopper 113c formed on the lower plate part 113 of the housing 110 may be inserted into the depression 111b formed on the upper plate part 111 of the housing 110. Furthermore, the fourth magnetic material 113b may be disposed inside the stopper 113c formed on the lower plate part 113 of the housing 110.

According to an embodiment, the cover 175 may have a thickness of about 0.5 mm. For example, the thickness of the upper end portion of the cover 175 that covers the top surfaces of the first section 171 and the second section 173 and the thickness of the lower end portion of the cover 175 that covers the bottom surfaces of the first section 171 and the second section 173 may be about 0.5 mm. Furthermore, the first section 171 and the second section 173 may have a thickness of about 1.5 mm. Accordingly, the overall thickness of the flexible hinge 170, including the thickness of the flexible printed circuit board 181, may be about 3 mm.

Figure 3:
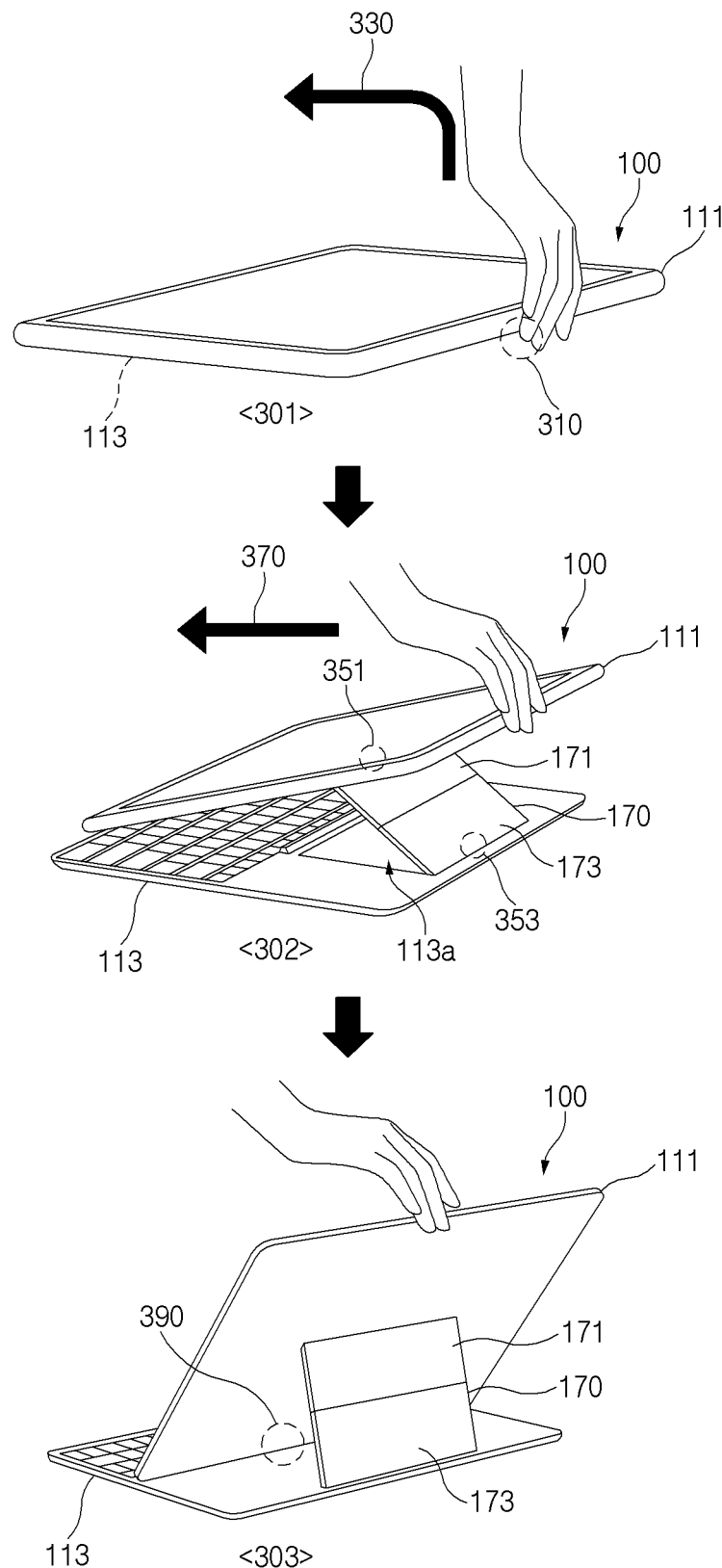
FIG. 3 is a view illustrating hinge motion of a flexible hinge according to an embodiment.

FIG. 3 is a view illustrating hinge motion of the flexible hinge according to an embodiment.

Referring to FIG. 3, the upper plate part 111 and the lower plate part 113 of the housing 110 of the electronic device 100 may be superimposed on each other as in a first state 301. For example, when the electronic device 100 is viewed from the front, the rear surface of the upper plate part 111 of the housing 110 and the front surface of the lower plate part 113 of the housing 110 may face each other.

According to an embodiment, the upper plate part 111 and the lower plate part 113 of the housing 110 may be connected together through the flexible hinge 170, and through hinge motion of the flexible hinge 170, the upper plate part 1110 of the housing 110 may be mounted on the lower plate part 113 while forming a specified angle with the lower plate part 113. For example, when in the first state 301, a user holds a specific portion 310 (e.g., a recessed portion) of the upper plate part 111 of the housing 110 and raises the upper plate part 111 of the housing 110 (330), the electronic device 100 may change to a third state 303 through a second state 302. Of course, the reverse is also possible. For example, when the user pushes the upper plate part 111 of the housing 110 downward in the third state 303, the electronic device 100 may change to the first state 301 through the second state 302.

According to an embodiment, when the user raises the upper plate part 111 of the housing 110 in the first state 301 (330), the portion of the flexible hinge 170 other than a second portion 353 (e.g., the second portion 195 of the cover 175 illustrated in FIG. 2) that is connected with the lower plate part 113 of the housing 110, as in the second state 302, may be separated from the seating portion 113a formed on the lower plate part 113 of the housing 110. At this time, a first portion 351 of the flexible hinge 170 (e.g., the first portion 193 of the cover 175 illustrated in FIG. 2) that is connected with the upper plate part 111 of the housing 110 and the second portion 353 of the flexible hinge 170 that is connected with the lower plate part 111 of the housing 110 may be bent. Furthermore, a first magnetic material (e.g., the first magnetic material 177 illustrated in FIG. 2) and a second magnetic material (e.g., the second magnetic material 179 illustrated in FIG. 2) that are disposed inside the first section 171 and the second section 173, respectively, may be fastened with each other, and the first section 171 and the second section 173 included in the flexible hinge 170 may be separated from the seating portion 113a while maintaining the form of a straight line as a whole.

Moreover, when in the second state 302, the user pulls or pushes the upper plate part 111 of the housing 110 in one direction 370 (e.g., the direction toward the first portion 351 from the second portion 353 of the flexible hinge 170), one end of the upper plate part 111 of the housing 110 (e.g., the portion where a magnetic material disposed in the upper plate part 111 is located), as in the third state 303, may be stopped by a stopper 390 (e.g., the stopper 113c illustrated in FIG. 2) that is formed on the lower plate part 113 of the housing 110. At this time, a third magnetic material (e.g., the third magnetic material 111a illustrated in FIG. 2) that is disposed in the upper plate part 111 of the housing 110 and a fourth magnetic material (e.g., the fourth magnetic material 113b illustrated in FIG. 2) that is disposed in the lower plate part 111 of the housing 110 may be fastened with each other, and the upper plate part 111 of the housing 110 may remain mounted on the lower plate part 113 while forming the specified angle with the lower plate part 113 of the housing 110.

Figure 4:
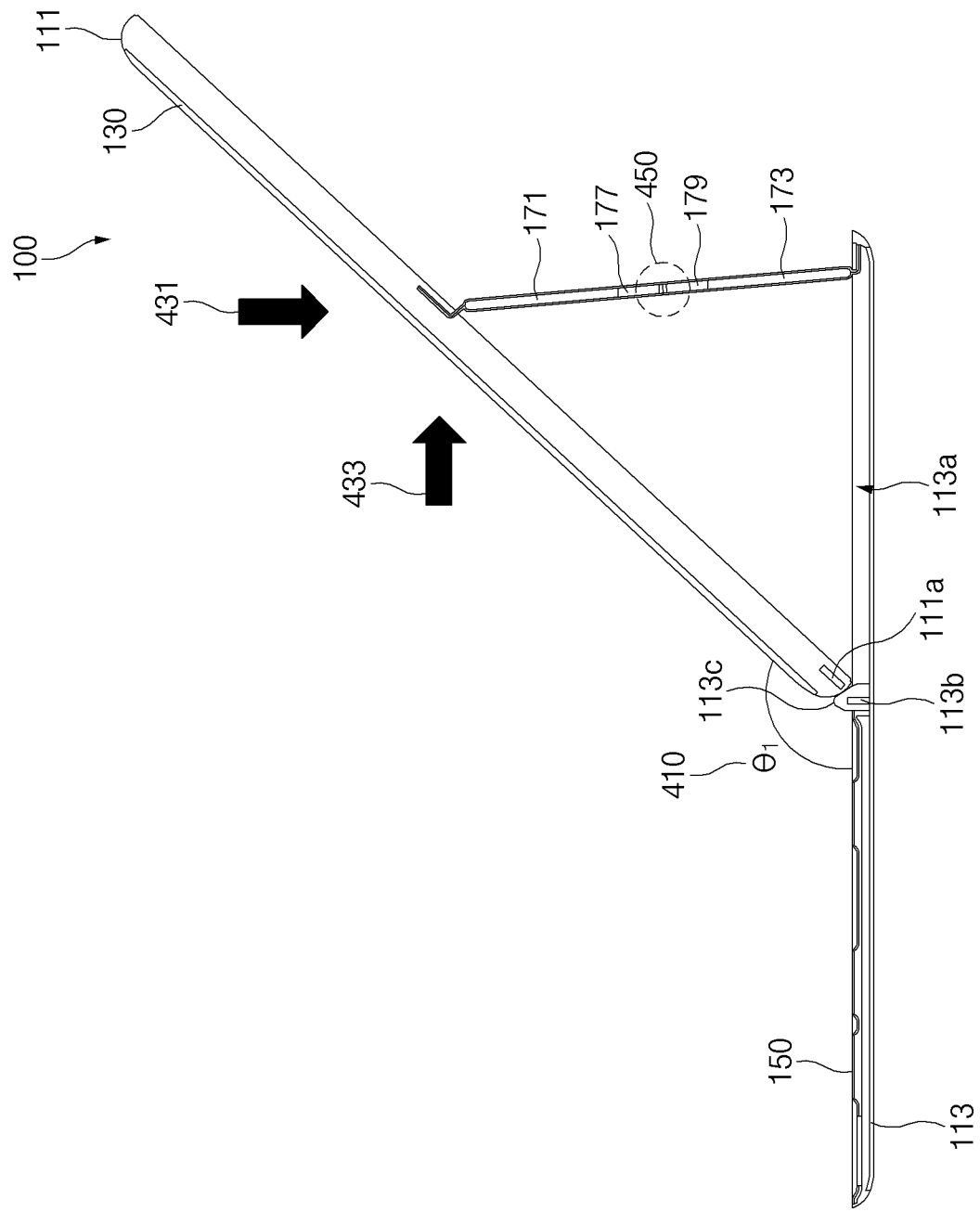
FIG. 4 is a view illustrating a first mounting form of the electronic device according to an embodiment.

FIG. 4 is a view illustrating a first mounting form of the electronic device according to an embodiment.

Referring to FIG. 4, the electronic device 100 may have the first mounting form when the upper plate part 111 of the housing 110 is raised until one end of the upper plate part 111 of the housing 110 (e.g., the portion where the third magnetic material 111a disposed in the upper plate part 111 is located) is stopped by the stopper 113c formed on the lower plate part 113 of the housing 110, in a state in which the upper plate part 111 and the lower plate part 113 of the housing 110 are superimposed on each other (e.g., the first state 301 of FIG. 3) (or, a state in which the upper plate part 111 and the lower plate part 113 are parallel to each other). For example, the upper plate part 111 of the housing 110 may be mounted on the lower plate part 113 while forming a specified angle (θ1) 410 (e.g., about 130 degrees) with the lower plate part 113 of the housing 110. At this time, the third magnetic material 111a disposed in the upper plate part 111 of the housing 110 and the fourth magnetic material 113b disposed in the lower plate part 111 of the housing 110 may be fastened with each other.

In the first mounting form, a first portion of the flexible hinge 170 (e.g., the first portion 193 of the cover 175 illustrated in FIG. 2) that is connected with the upper plate part 111 of the housing 110 and a second portion of the flexible hinge 170 (e.g., the second portion 195 of the cover 175 illustrated in FIG. 2) that is connected with the lower plate part 111 of the housing 110 may be bent. Furthermore, the first magnetic material 177 and the second magnetic material 179 that are disposed inside the first section 171 and the second section 173, respectively, may be fastened with each other by a magnetic force of a specified magnitude or more, and the first section 171 and the second section 173 included in the flexible hinge 170 may maintain the form of a straight line as a whole. In this regard, the first section 171 and the second section 173 may maintain the form of a straight line because the attraction force at the point 450 where the first section 171 and the second section 173 are fastened with each other by the magnetic force is balanced with the forces in the vertical direction 431 and the horizontal direction 433 according to the load of the upper plate part 111 of the housing 110.

In the first mounting form, a user may use the functional module 150 because the functional module 150 seated in the lower plate part 113 of the housing 110 is exposed to the outside. For example, in the first mounting form, the keyboard included in the functional module 150 may be exposed to the outside, and accordingly the user may use the keyboard.

Figure 5:
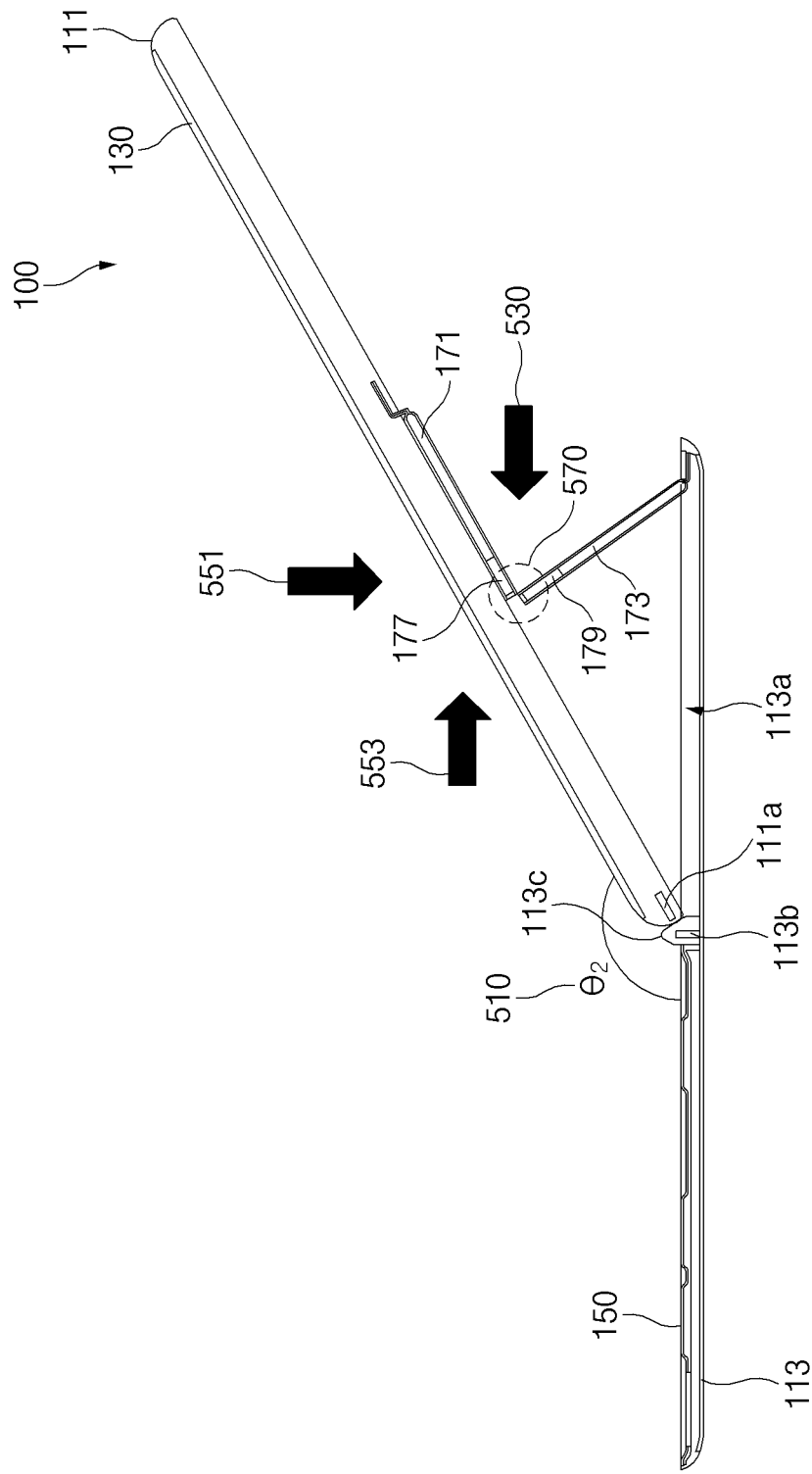
FIG. 5 is a view illustrating a second mounting form of the electronic device according to an embodiment.

FIG. 5 is a view illustrating a second mounting form of the electronic device according to an embodiment.

Referring to FIG. 5, in the electronic device 100, the first magnetic material 177 and the second magnetic material 179 may be unfastened when an external force of a specified magnitude or more is applied in one direction 530 (e.g., a direction from the lower end portion of the cover 175, to which the flexible printed circuit board 181 is adjacent, to the upper end portion of the cover 175) to an area 570 where the first section 171 and the second section 173 included in the flexible hinge 170 are fastened with each other, in a state in which the upper plate part 111 of the housing 110 is mounted on the lower plate part 113 while forming a first angle (e.g., the specified angle 410 of FIG. 4) with the lower plate part 113 of the housing 110 (e.g., the third state 303 of FIG. 3 or the state of the electronic device 100 illustrated in FIG. 4). That is, the first section 171 and the second section 173 may be unfastened. In this case, the first section 171 may be superimposed on the upper plate part 111 of the housing 110 (or, the first section 171 and the upper plate part 111 may be parallel to each other), and the second section 173 may form a predetermined angle with lower plate part 113 of the housing 110. For example, the second section 173 may support the upper plate part 111 of the housing 110, and accordingly the upper plate part 111 of the housing 110 may be mounted on the lower plate part 113 in the second mounting form while forming a second angle (θ2) 510 (e.g., about 150 degrees) with the lower plate part 113 of the housing 110.

In the second mounting form, one end of the upper plate part 111 of the housing 110 (e.g., the portion where the third magnetic material 111a disposed in the upper plate part 111 is located) may remain stopped by the stopper 113c formed on the lower plate part 113 of the housing 110. Furthermore, because the force by which the second section 173 supports the upper plate part 111 of the housing 110 and the forces in the vertical direction 551 and the horizontal direction 553 according to the load of the upper plate part 111 are in equilibrium, the upper plate part 111 of the housing 110 may be mounted on the lower plate part 113 while forming the second angle 510 with the lower plate part 113.

In the second mounting form, the angle that the upper plate part 111 of the housing 110 forms with the lower plate part 113 of the housing 110 may be larger than the angle in the first mounting form of FIG. 4. Accordingly, the second mounting form of the electronic device 100 may refer to a good mounting state for a user to work with the electronic device 100 placed on the user's laps in a situation in which there is no table.

Figure 6:
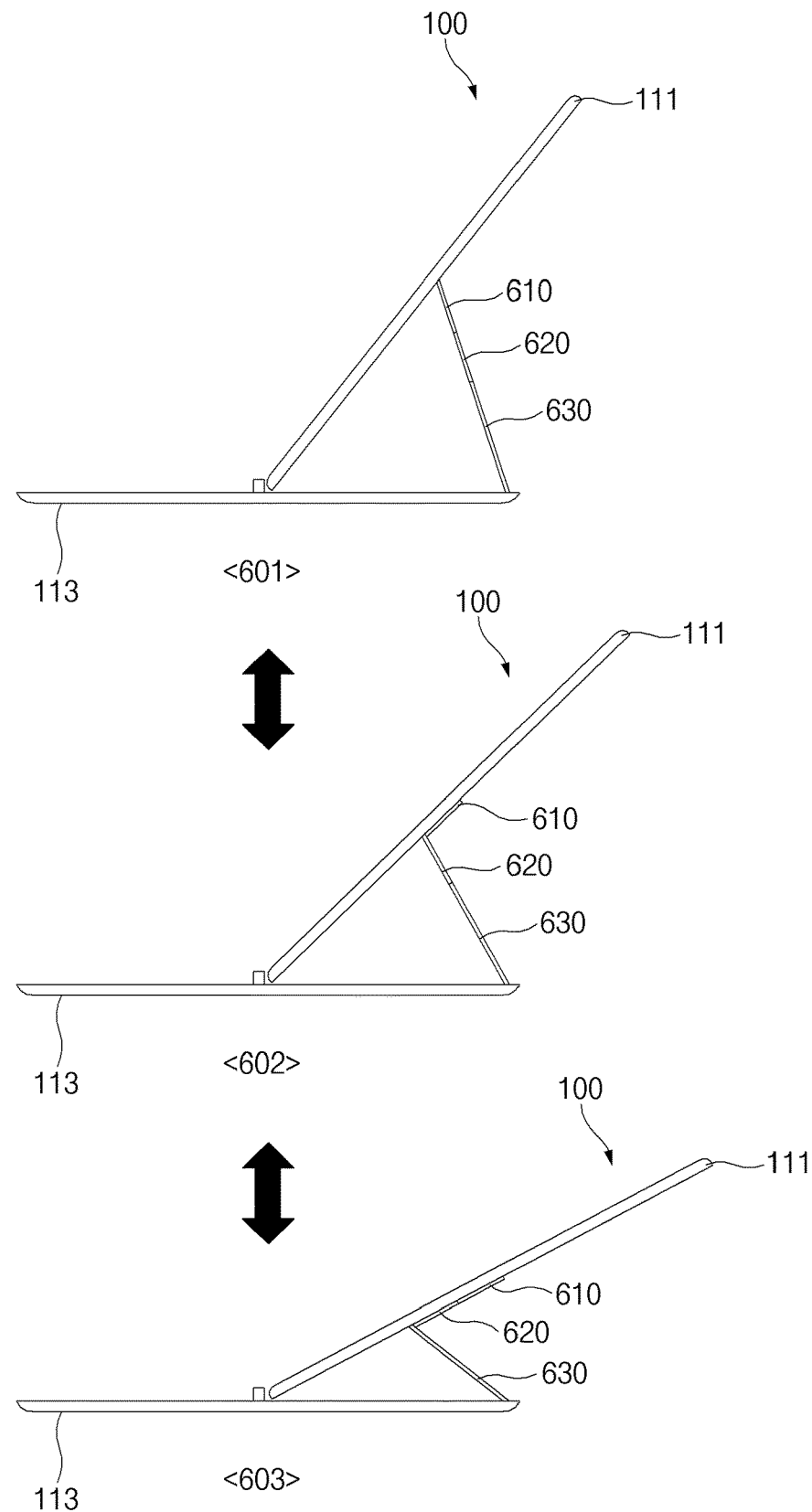
FIG. 6 is a view illustrating mounting forms of the electronic device depending on the number of sections of a flexible hinge according to an embodiment.

FIG. 6 is a view illustrating mounting forms of the electronic device depending on the number of sections of a flexible hinge according to an embodiment.

According to an embodiment, the flexible hinge (e.g., the flexible hinge 170) that connects the upper plate part 111 and the lower plate part 113 of the housing 110 of the electronic device 100 may include a plurality of sections. Although the form in which the flexible hinge includes two sections (e.g., the first section 171 and the second section 173) has been described above with reference to the drawings, a form in which the flexible hinge includes three sections will be described below with reference to FIG. 6.

Referring to FIG. 6, the flexible hinge may include a first section 610, a second section 620, and a third section 630. According to an embodiment, although not illustrated, the first section 610 may include a first magnetic material inside an area adjacent to the second section 620. Furthermore, the second section 620 may include, inside an area adjacent to the first section 610, a second magnetic material that is capable of being fastened with the first magnetic material, and may include a third magnetic material inside an area adjacent to the third section 630. In addition, the third section 630 may include, inside an area adjacent to the second section 620, a fourth magnetic material that is capable of being fastened with the third magnetic material.

The first magnetic material, the second magnetic material, the third magnetic material, and the fourth magnetic material may have a magnetic force of a specified magnitude or more. Accordingly, the first magnetic material and the second magnetic material may allow the first section 610 and the second section 620 to be fastened with each other in the form of a straight line, and the third magnetic material and the fourth magnetic material may allow the second section 620 and the third section 630 to be fastened with each other in the form of a straight line.

In a first state 601, the first magnetic material and the second magnetic material may be fastened with each other, and the third magnetic material and the fourth magnetic material may be fastened with each other. Accordingly, the first section 610, the second section 620, and the third section 630 may be disposed in the form of a straight line as a whole.

In a second state 602, the first magnetic material and the second magnetic material may be unfastened, and accordingly the first section 610 and the second section 620 may be unfastened. In this case, the first section 610 may be superimposed on the upper plate part 111 of the housing 110 (or, the first section 610 and the upper plate part 111 may be parallel to each other). Furthermore, the third magnetic material and the fourth magnetic material may remain fastened with each other, and accordingly the second section 620 and the third section 630 may be disposed in the form of a straight line.

In a third state 603, the third magnetic material and the fourth magnetic material may be unfastened, and accordingly the second section 620 and the third section 630 may be unfastened. In this case, because the first magnetic material and the second magnetic material remain fastened with each other, the first section 610 and the second section 620 may be superimposed on the upper plate part 111 of the housing 110 while maintaining the form of a straight line as a whole (or, the first section 610 and the second section 620 may be parallel to the upper plate part 111).

According to an embodiment, the angle formed by the upper plate part 111 and the lower plate part 113 of the housing 110 may become larger in the sequence of the first state 601, the second state 602, and the third state 603.

Although the case where the flexible hinge includes the three sections has been described above with reference to FIG. 6, the number of sections included in the flexible hinge is not limited thereto. For example, the number of sections included in the flexible hinge may exceed three. Furthermore, the number of mounting forms of the electronic device 100 may be increased with an increase in the number of sections included in the flexible hinge. For example, the number of mounting forms of the electronic device 100 may correspond to the number of sections included in the flexible hinge.

Figure 7:
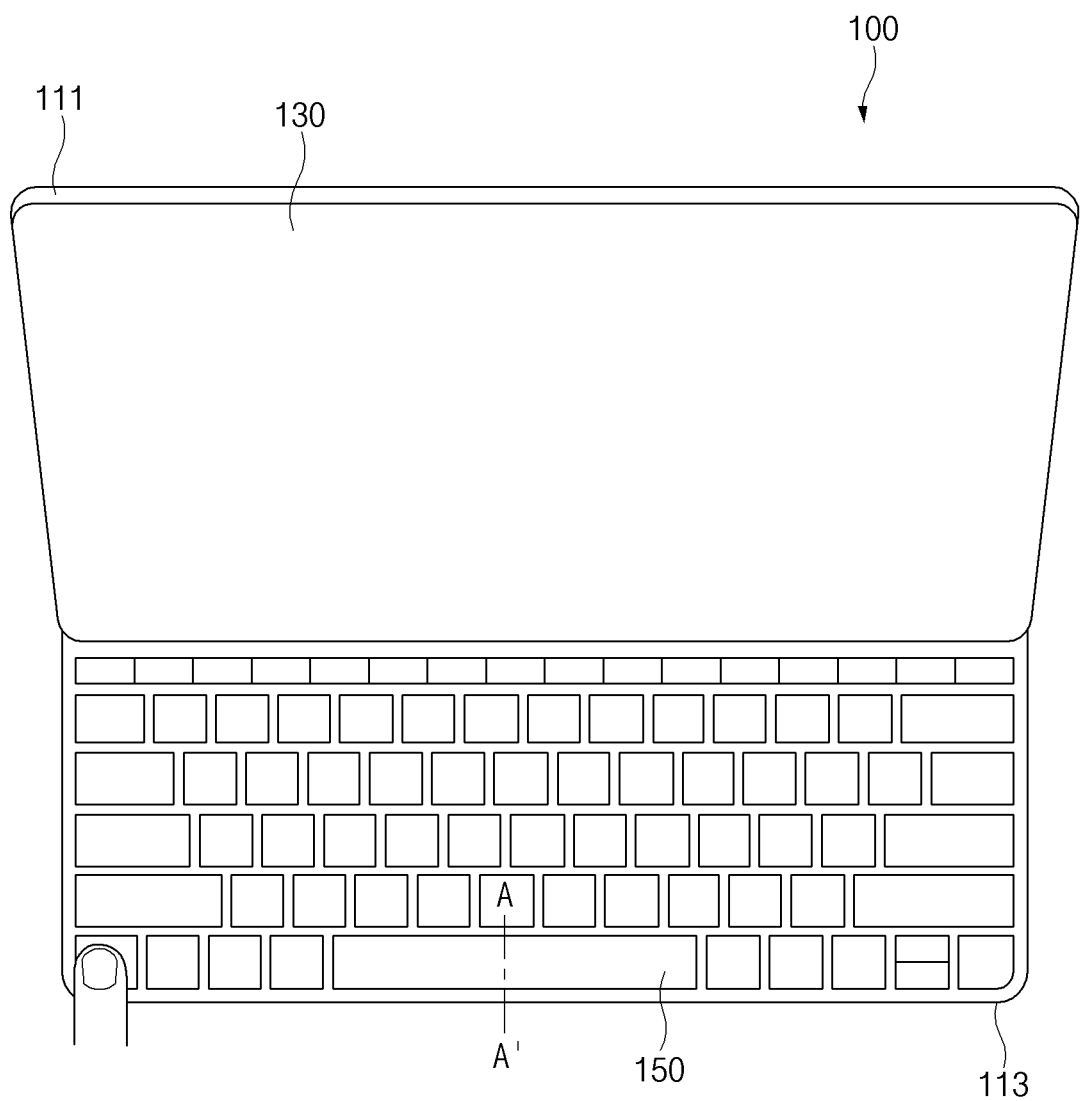
FIG. 7 is a view illustrating a keyboard included in a functional module according to an embodiment.
Figure 8:
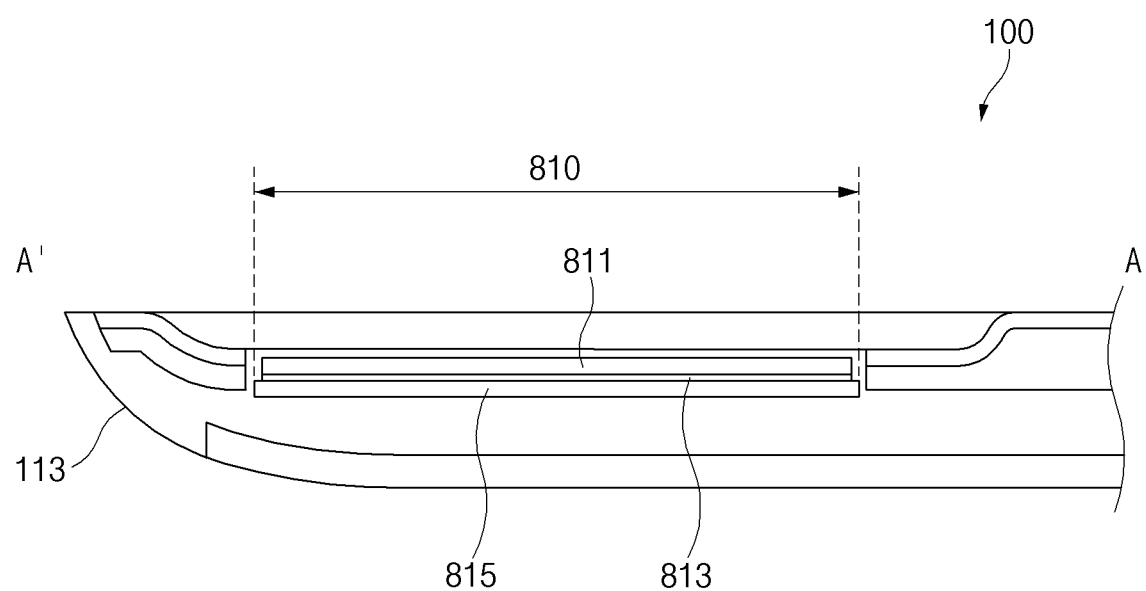
FIG. 8 is a sectional view taken along line A-A' of FIG. 7 according to an embodiment.

FIG. 7 is a view illustrating a keyboard included in a functional module according to an embodiment, and FIG. 8 is a sectional view taken along line A-A' of FIG. 7 according to an embodiment.

Referring to FIGS. 7 and 8, in the electronic device 100, the display 130 may be seated in the upper plate part 111 of the housing 110, and the functional module 150 may be seated in the lower plate part 113 of the housing 110. According to an embodiment, the functional module 150 may include a keyboard.

According to an embodiment, when the functional module 150 includes the keyboard, a glass housing 811, a touch film 813, and a light-source display 815 may be disposed inward of an area 810 of a specific key (e.g., a space bar) among keys included in the keyboard. The glass housing 811, the touch film 813, and the light-source display 815 may be disposed by being stacked in order. For example, the touch film 813 may be laminated on a rear surface of the glass housing 811, and the light-source display 815 may be disposed under the touch film 813.

According to an embodiment, unlike the other keys included in the keyboard, the specific key may be operated in the form of a touch key using electrical characteristics of the touch film 813 rather than the form of a physical key that is operated by being pressed by pressure of a specified magnitude. For example, the specific key may be operated by touching the area 810 of the specific key using a touch object (e.g., a finger or an electronic pen). Furthermore, the light-source display 815 may visually provide information to a user. For example, the light-source display 815 may display text, an image, an icon, a symbol, or the like, and the information displayed through the light-source display 815 may be exposed to the outside through the glass housing 811.

Figure 9:
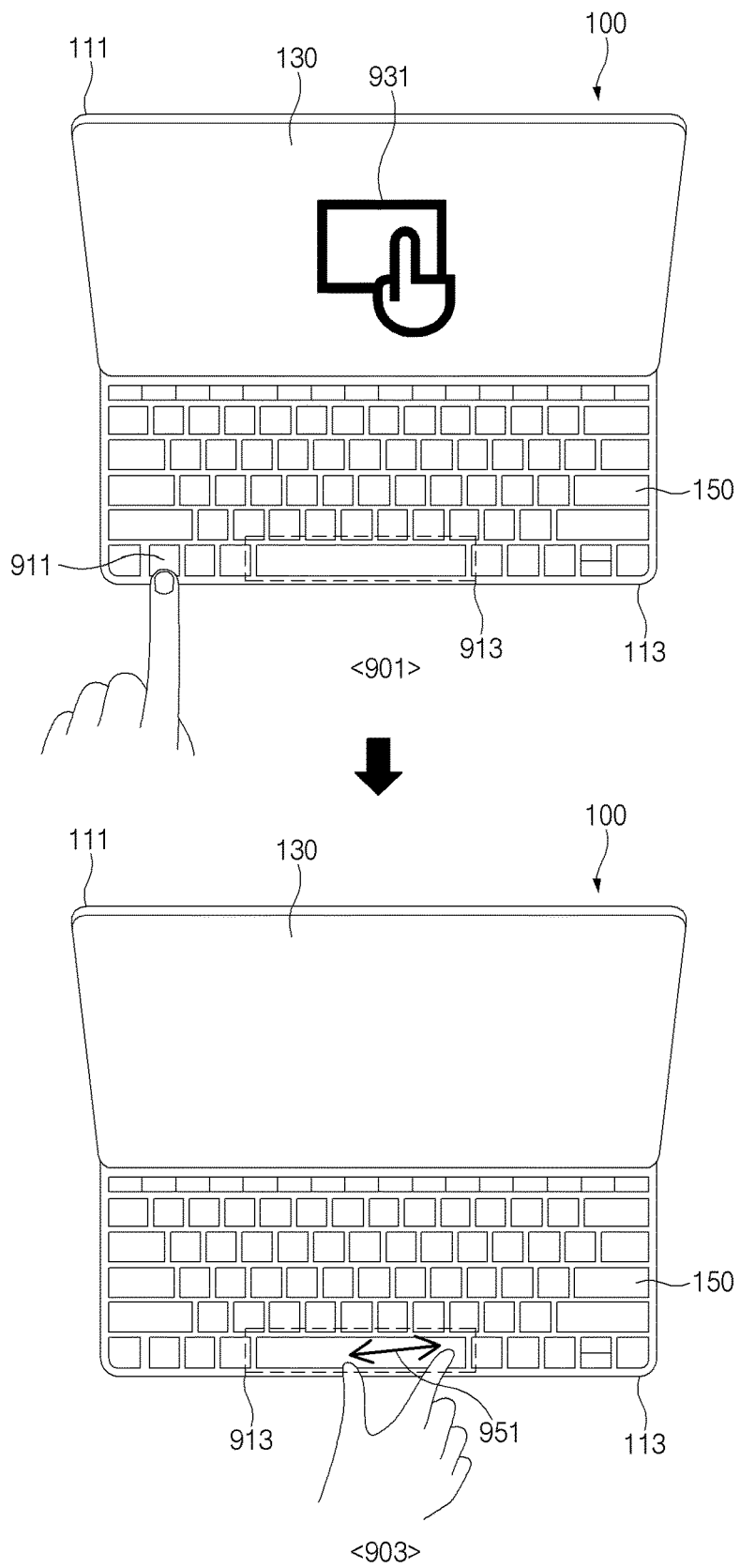
FIG. 9 is a view illustrating a method of using a specific key among keys included in a keyboard as a touch pad according to an embodiment.

FIG. 9 is a view illustrating a method of using a specific key among keys included in a keyboard as a touch pad according to an embodiment.

Referring to FIG. 9, in the electronic device 100, the display 130 may be seated in the upper plate part 111 of the housing 110, and the functional module 150 may be seated in the lower plate part 113 of the housing 110.

According to an embodiment, the functional module 150 may include a keyboard, and when an area 913 of a specific key (e.g., a space bar) among keys included in the keyboard operates in the form of a touch key, the specific key area 913 may be used as a touch pad. For example, as in a first state 901, when a specified key 911 (e.g., a function key) among the keys included in the keyboard is pressed, a processor of the electronic device 100 may output, on the display 130, an object 931 (e.g., an icon) that informs a user that the specific key area 913 is able to be used as a touch pad. Furthermore, the processor, as in a second state 903, may process a touch input 951 (e.g., a gesture input) that is detected in the specific key area 913. The touch input 951 may include, for example, a tap input, a scroll input, a multi-touch input, or the like.

According to an embodiment, when the specified key 911 is pressed again in a state in which the specific key area 913 is configured to be used as a touch pad, the specific key area 913 may be used for the original function of the specific key. For example, the specific key area 913 may be used for input of a blank. That is, the specified key 911 may be used as a toggle key for changing the function of the specific key area 913.

Figure 10:
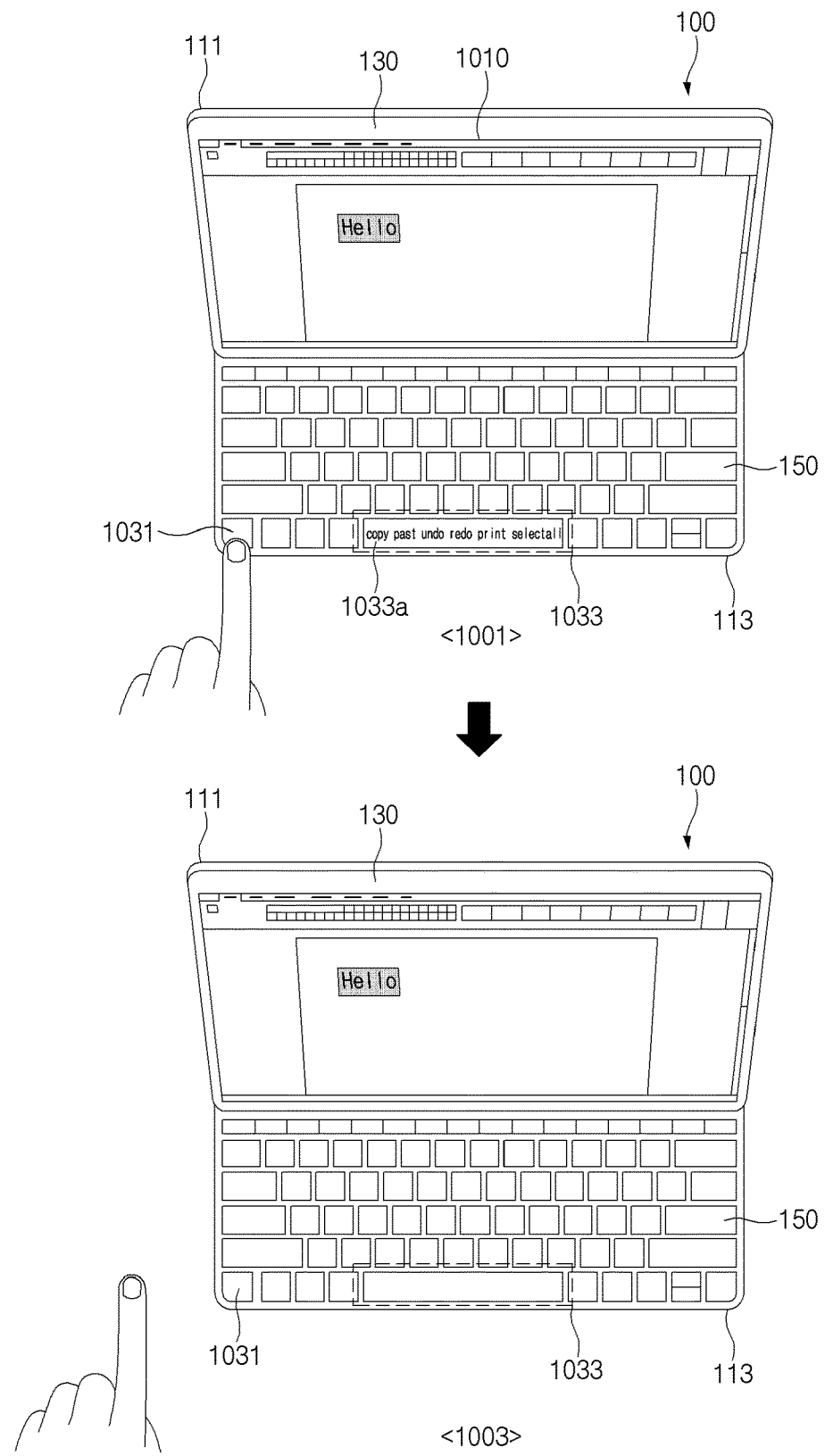
FIG. 10 is a view illustrating a method of using a specific key among keys included in a keyboard as a shortcut key according to an embodiment.

FIG. 10 is a view illustrating a method of using a specific key among keys included in a keyboard as a shortcut key according to an embodiment.

Referring to FIG. 10, in the electronic device 100, the display 130 may be seated in the upper plate part 111 of the housing 110, and the functional module 150 may be seated in the lower plate part 113 of the housing 110.

According to an embodiment, the functional module 150 may include a keyboard, and when an area 1033 of a specific key (e.g., a space bar) among keys included in the keyboard operates in the form of a touch key, the specific key area 1033 may be used as at least one shortcut key. For example, in a state in which a specified key 1031 (e.g., a control key) among the keys included in the keyboard is pressed, the processor of the electronic device 100, as in a first state 1001, may display an object 1033a (e.g., text, an image, an icon, a symbol, or the like) that represents at least one shortcut key, through a light-source display (e.g., the light-source display 815 of FIG. 8) that is disposed inward of the specific key area 1033. Furthermore, when a touch input is detected in the region where the object 1033a is displayed in the specific key area 1033, the processor may determine the touch point of the detected touch input and may perform the function of a shortcut key that the object 1033a displayed at the touch point represents.

In the illustrated drawing, it is exemplified that shortcut keys, such as copy, paste, cut, and the like, which are able to be used for word processing are set as shortcut keys that are able to be used through the specific key area 1033.

According to an embodiment, in a state in which the specific key area 1033 is configured to be used as at least one shortcut key (e.g., a state in which the specified key 1031 is pressed), the specific key area 1033, as in a second state 1003, may be used for the original function of the specific key when the pressed state of the specified key 1031 is released (e.g., when the specified key 1031 is released). For example, the specific key area 1033 may be used for input of a blank.

Figure 11:
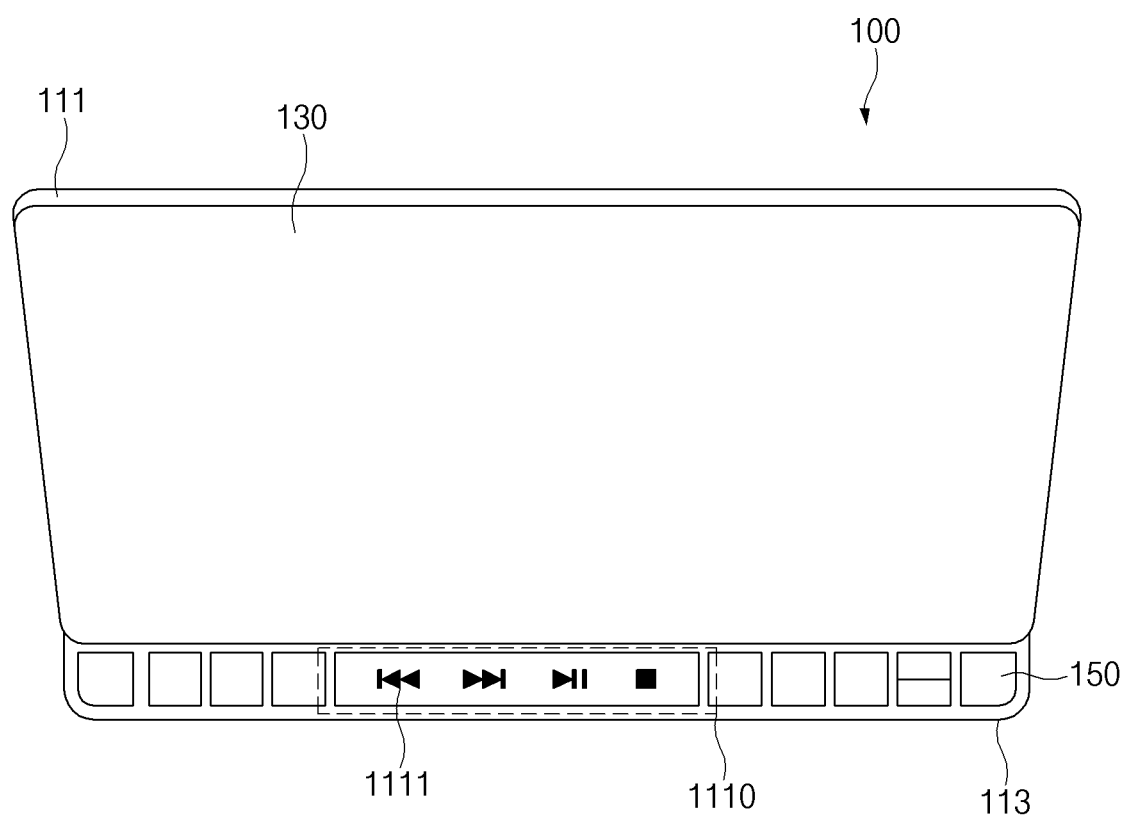
FIG. 11 is a view illustrating a method of differently setting the type of shortcut key depending on the type of application output on a screen when setting a specific key among keys included in a keyboard as a shortcut key according to an embodiment.

FIG. 11 is a view illustrating a method of differently setting the type of shortcut key depending on the type of application output on a screen when setting a specific key among keys included in a keyboard as a shortcut key according to an embodiment.

Referring to FIG. 11, in the electronic device 100, the display 130 may be seated in the upper plate part 111 of the housing 110, and the functional module 150 may be seated in the lower plate part 113 of the housing 110.

According to an embodiment, the functional module 150 may include a keyboard, and when an area 1110 of a specific key (e.g., a space bar) among keys included in the keyboard operates in the form of a touch key, the specific key area 1110 may be used as at least one shortcut key.

According to an embodiment, when the specific key area 1110 is configured to be used as at least one shortcut key, the processor of the electronic device 100 may differently set the type of shortcut key depending on the type of application output on the screen of the display 130. For example, when the application output on the screen of the display 130 is a word processing application, the processor may make a configuration such that the specific key area 1110 is used as a shortcut key, such as copy, paste, cut, or the like, which is able to be used for word processing. FIG. 11 illustrates a state in which the processor determines that the application output on the screen of the display 130 is a multi-media playback application and the processor sets the specific key area 1110 as a shortcut key (e.g., play, pause, stop, or the like) that is related to multi-media playback. In this case, the processor may display an object 1111 representing the shortcut key related to multi-media playback, through a light-source display (e.g., the light-source display 815 of FIG. 8) that is disposed inward of the specific key area 1110, and the processor may perform the function of the set shortcut key depending on a touch input detected in the specific key area 1110.

As described above, according to various embodiments, an electronic device (e.g., the electronic device 100) may include a housing (e.g., the housing 110) that includes an upper plate part (e.g., the upper plate part 111) and a lower plate part (e.g., the lower plate part 113), and a flexible hinge (e.g., the flexible hinge 170) that connects the upper plate part and the lower plate part, in which the upper plate part (e.g., the upper plate part 111) includes a first surface that faces a first direction, a second surface that faces a second direction opposite to the first direction, and a third surface that partially surrounds a space between the first surface and the second surface, the lower plate part (e.g., the lower plate part 113) includes a fourth surface that faces the first direction, a fifth surface that faces the second direction, and a sixth surface that partially surrounds a space between the fourth surface and the fifth surface, and in a first state, the fourth surface faces the second surface of the upper plate part. The flexible hinge may include a first section (e.g., the first section 171) that has a first magnetic material (e.g., the first magnetic material 177) disposed therein which has magnetism of a specified first magnitude or more, the first section being formed of a first material having strength of a specified second magnitude or more, a second section (e.g., the second section 173) that has a second magnetic material (e.g., the second magnetic material 179) disposed therein which has magnetism of a specified third magnitude or more, the second section being formed of a second material having strength of a specified fourth magnitude or more, and a cover (e.g., the cover 175) that at least partially surround the first section and the second section and that is formed of a third material having strength of less than a specified fifth magnitude. When changed from the first state to a second state, the first magnetic material and the second magnetic material may fasten the first section and the second section in the form of a substantially straight line, and in the second state, the upper plate part may be mounted on the lower plate part while forming a specified first angle (e.g., the angle 410) with the lower plate part.

According to various embodiments, the lower plate part may further include, on a partial area thereof, a seating portion (e.g., the seating portion 113a) concavely formed in the second direction from the fourth surface, and the flexible hinge may be seated on the seating portion in the first state.

According to various embodiments, in the first state, a surface of the flexible hinge that is exposed to the outside may be placed on substantially the same plane as the fourth surface.

According to various embodiments, the lower plate part may further include, on a partial area thereof, a stopper (e.g., the stopper 113c) protruding from the fourth surface in the first direction, and in the second state, one end of the upper plate part may be stopped by the stopper.

According to various embodiments, the upper plate part may further include, on a partial area thereof, a depression (e.g., the depression 111b) concavely formed in the first direction from the second surface, and the stopper may be inserted into the depression in first state.

According to various embodiments, the upper plate part may include a third magnetic material (e.g., the third magnetic material 111a) disposed inside one end thereof, the lower plate part may include a fourth magnetic material (e.g., the fourth magnetic material 113b) disposed inside a partial area thereof, and in the second state, the third magnetic material and the fourth magnetic material may be fastened with each other.

According to various embodiments, the third material may include at least one of urethane, poly urethane, fabric, or thermoplastic poly urethane.

According to various embodiments, at least one of the first magnetic material or the second magnetic material may contain neodymium.

According to various embodiments, the electronic device may further include a display (e.g., the display 130) that is seated in the upper plate part.

According to various embodiments, the electronic device may further include a functional module (e.g., the functional module 150) that is seated in the lower plate part.

According to various embodiments, the electronic device may further include a flexible printed circuit board (e.g., the flexible printed circuit board 181) that is disposed inside the cover, and the flexible printed circuit board may electrically connect the display and the functional module.

According to various embodiments, the flexible printed circuit board may be disposed adjacent to an inner surface of a lower end portion of the cover when viewed from above the first surface.

According to various embodiments, at least one of the first magnetic material and the second magnetic material may be disposed adjacent to an upper end portion of the cover.

According to various embodiments, the second state may be changed to a third state when pressure of a specified sixth magnitude or more is applied to a partial area of the flexible hinge, the first magnetic material and the second magnetic material may be unfastened when the second state is changed to the third state, and in the third state, the upper plate part may be mounted on the lower plate part while forming a specified second angle (e.g., the second angle 510) with the lower plate part.

According to various embodiments, the first angle may be smaller than the second angle.

According to various embodiments, the functional module may include a keyboard including a space bar area including a space bar used for input of a blank.

According to various embodiments, when viewed from above the fourth surface, a glass housing (e.g., the glass housing 811), a touch film (e.g., the touch film 813), and a light-source display (e.g., the light-source display 815) may be stacked and disposed inward of the space bar area (e.g., the specific key area 810).

According to various embodiments, when a specified key among keys included in the keyboard is selected, the space bar area may be set as an area for receiving a gesture input of a user.

According to various embodiments, the space bar area may be set as an area for input of a blank when the specified key is selected in a state in which the space bar area is set as the area for receiving the gesture input of the user.

According to various embodiments, in a state in which a specified key among keys included in the keyboard is pressed, the light-source display may display an object corresponding to at least one shortcut key that provides a specified function, and the space bar area may be set as an area for selecting the at least one shortcut key. When the pressed state of the specified key is released, the light-source display may end the display of the object, and the space bar area may be set as an area for input of a blank.

Figure 12:
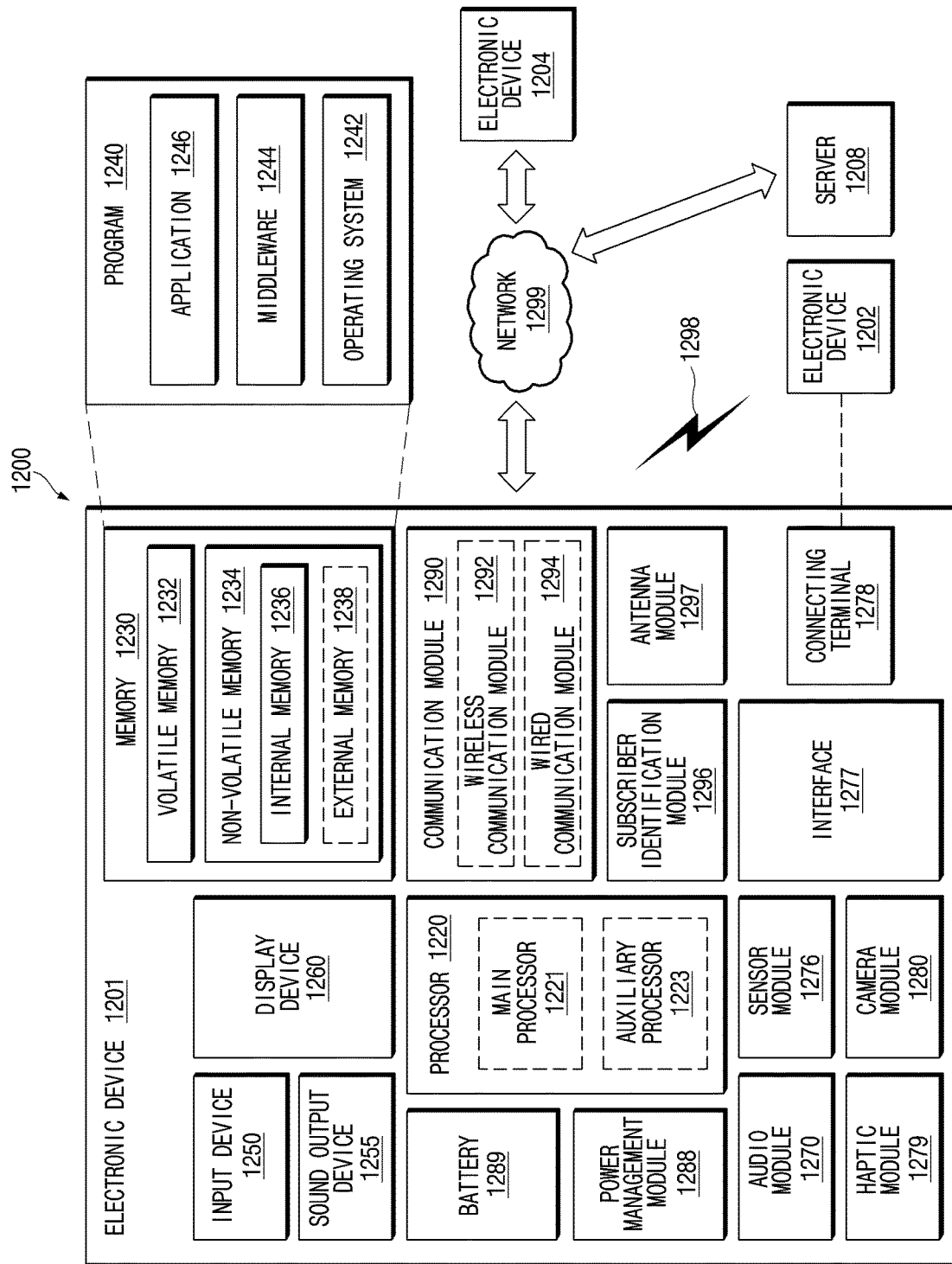
FIG. 12 is a block diagram of an electronic device in a network environment according to various embodiments.

FIG. 12 is a block diagram of an electronic device in a network environment according to various embodiments.

Referring to FIG. 12, an electronic device 1201 may communicate with an electronic device 1202 through a first network 1298 (e.g., a short-range wireless communication) or may communicate with an electronic device 1204 or a server 1208 through a second network 1299 (e.g., a long-distance wireless communication) in a network environment 1200. According to an embodiment, the electronic device 1201 may communicate with the electronic device 1204 through the server 1208. According to an embodiment, the electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module 1296, and an antenna module 1297. According to some embodiments, at least one (e.g., the display device 1260 or the camera module 1280) among components of the electronic device 1201 may be omitted or other components may be added to the electronic device 1201. According to some embodiments, some components may be integrated and implemented as in the case of the sensor module 1276 (e.g., a fingerprint sensor, an iris sensor, or an illuminance sensor) embedded in the display device 1260 (e.g., a display).

The processor 1220 may operate, for example, software (e.g., a program 1240) to control at least one of other components (e.g., a hardware or software component) of the electronic device 1201 connected to the processor 1220 and may process and compute a variety of data. The processor 1220 may load a command set or data, which is received from other components (e.g., the sensor module 1276 or the communication module 1290), into a volatile memory 1232, may process the loaded command or data, and may store result data into a nonvolatile memory 1234. According to an embodiment, the processor 1220 may include a main processor 1221 (e.g., a central processing unit or an application processor) and an auxiliary processor 1223 (e.g., a graphic processing device, an image signal processor, a sensor hub processor, or a communication processor), which operates independently from the main processor 1221, additionally or alternatively uses less power than the main processor 1221, or is specified to a designated function. In this case, the auxiliary processor 1223 may operate separately from the main processor 1221 or embedded.

In this case, the auxiliary processor 1223 may control, for example, at least some of functions or states associated with at least one component (e.g., the display device 1260, the sensor module 1276, or the communication module 1290) among the components of the electronic device 1201 instead of the main processor 1221 while the main processor 1221 is in an inactive (e.g., sleep) state or together with the main processor 1221 while the main processor 1221 is in an active (e.g., an application execution) state. According to an embodiment, the auxiliary processor 1223 (e.g., the image signal processor or the communication processor) may be implemented as a part of another component (e.g., the camera module 1280 or the communication module 1290)

that is functionally related to the auxiliary processor 1223. The memory 1230 may store a variety of data used by at least one component (e.g., the processor 1220 or the sensor module 1276) of the electronic device 1201, for example, software (e.g., the program 1240) and input data or output data with respect to commands associated with the software. The memory 1230 may include the volatile memory 1232 or the nonvolatile memory 1234.

The program 1240 may be stored in the memory 1230 as software and may include, for example, an operating system 1242, a middleware 1244, or an application 1246.

The input device 1250 may be a device for receiving a command or data, which is used for a component (e.g., the processor 1220) of the electronic device 1201, from an outside (e.g., a user) of the electronic device 1201 and may include, for example, a microphone, a mouse, or a keyboard.

The sound output device 1255 may be a device for outputting a sound signal to the outside of the electronic device 1201 and may include, for example, a speaker used for general purposes, such as multimedia play or recordings play, and a receiver used only for receiving calls. According to an embodiment, the receiver and the speaker may be either integrally or separately implemented.

The display device 1260 may be a device for visually presenting information to the user of the electronic device 1201 and may include, for example, a display, a hologram device, or a projector and a control circuit for controlling a corresponding device. According to an embodiment, the display device 1260 may include a touch circuitry or a pressure sensor for measuring an intensity of pressure on the touch.

The audio module 1270 may convert a sound and an electrical signal in dual directions. According to an embodiment, the audio module 1270 may obtain the sound through the input device 1250 or may output the sound through an external electronic device (e.g., the electronic device 1202 (e.g., a speaker or a headphone)) wired or wirelessly connected to the sound output device 1255 or the electronic device 1201.

The sensor module 1276 may generate an electrical signal or a data value corresponding to an operating state (e.g., power or temperature) inside or an environmental state outside the electronic device 1201. The sensor module 1276 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1277 may support a designated protocol wired or wirelessly connected to the external electronic device (e.g., the electronic device 1202). According to an embodiment, the interface 1277 may include, for example, an HDMI (high-definition multimedia interface), a USB (universal serial bus) interface, an SD card interface, or an audio interface.

A connecting terminal 1278 may include a connector that physically connects the electronic device 1201 to the external electronic device (e.g., the electronic device 1202), for example, an HDMI connector, a USB connector, an SD card connector, or an audio connector (e.g., a headphone connector).

The haptic module 1279 may convert an electrical signal to a mechanical stimulation (e.g., vibration or movement) or an electrical stimulation perceived by the user through tactile or kinesthetic sensations. The haptic module 1279 may include, for example, a motor, a piezoelectric element, or an electric stimulator.

The camera module 1280 may shoot a still image or a video image. According to an embodiment, the camera module 1280 may include, for example, at least one lens, an image sensor, an image signal processor, or a flash.

The power management module 1288 may be a module for managing power supplied to the electronic device 1201 and may serve as at least a part of a power management integrated circuit (PMIC).

The battery 1289 may be a device for supplying power to at least one component of the electronic device 1201 and may include, for example, a non-rechargeable (primary) battery, a rechargeable (secondary) battery, or a fuel cell.

The communication module 1290 may establish a wired or wireless communication channel between the electronic device 1201 and the external electronic device (e.g., the electronic device 1202, the electronic device 1204, or the server 1208) and support communication execution through the established communication channel. The communication module 1290 may include at least one communication processor operating independently from the processor 1220 (e.g., the application processor) and supporting the wired communication or the wireless communication. According to an embodiment, the communication module 1290 may include a wireless communication module 1292 (e.g., a cellular communication module, a short-range wireless communication module, or a GNSS (global navigation satellite system) communication module) or a wired communication module 1294 (e.g., an LAN (local area network) communication module or a power line communication module) and may communicate with the external electronic device using a corresponding communication module among them through the first network 1298 (e.g., the short-range communication network such as a Bluetooth, a WiFi direct, or an IrDA (infrared data association)) or the second network 1299 (e.g., the long-distance wireless communication network such as a cellular network, an internet, or a computer network (e.g., LAN or WAN)). The above-mentioned various communication modules 1290 may be implemented into one chip or into separate chips, respectively.

According to an embodiment, the wireless communication module 1292 may identify and authenticate the electronic device 1201 using user information stored in the subscriber identification module 1296 in the communication network.

The antenna module 1297 may include one or more antennas to transmit or receive the signal or power to or from an external source. According to an embodiment, the communication module 1290 (e.g., the wireless communication module 1292) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1201 and the external electronic device 1204 through the server 1208 connected to the second network 1299. Each of the electronic devices 1202 and 1204 may be the same or different types as or from the electronic device 1201. According to an embodiment, all or some of the operations performed by the electronic device 1201 may be performed by another electronic device or a plurality of external electronic devices. When the electronic device 1201 performs some functions or services automatically or by request, the electronic device 1201 may request the external electronic device to perform at least some of the functions related to the functions or services, in addition to or instead of performing the functions or services by itself. The external electronic device receiving the request may carry out the requested function or the additional function and transmit the result to the electronic device 1201. The electronic device 1201 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1240) including an instruction stored in a machine-readable storage media (e.g., an internal memory 1236 or an external memory 1238) readable by a machine (e.g., a computer). The machine may be a device that calls the instruction from the machine-readable storage media and operates depending on the called instruction and may include the electronic device (e.g., the electronic device 1201). When the instruction is executed by the processor (e.g., the processor 1220), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
    a housing including an upper plate part and a lower plate part, wherein the upper plate part includes a first surface configured to face a first direction, a second surface configured to face a second direction opposite to the first direction, and a third surface configured to partially surround a space between the first surface and the second surface, the lower plate part includes a fourth surface configured to face the first direction, a fifth surface configured to face the second direction, and a sixth surface configured to partially surround a space between the fourth surface and the fifth surface, and in a first state, the fourth surface faces the second surface of the upper plate part; and
    a flexible hinge configured to connect the upper plate part and the lower plate part,
    wherein the flexible hinge includes:
    a first section having a first magnetic material disposed therein which has magnetism of a specified first magnitude or more, the first section being formed of a first material having strength of a specified second magnitude or more;
a second section having a second magnetic material disposed therein which has magnetism of a specified third magnitude or more, the second section being formed of a second material having strength of a specified fourth magnitude or more; and
a cover configured to at least partially surround the first section and the second section and formed of a third material having strength of less than a specified fifth magnitude,
wherein when changed from the first state to a second state, the first magnetic material and the second magnetic material fasten the first section and the second section in the form of a substantially straight line, and
wherein in the second state, the upper plate part is mounted on the lower plate part while forming a specified first angle with the lower plate part.

2. The electronic device of claim 1, wherein the lower plate part further includes, on a partial area thereof, a seating portion concavely formed in the second direction from the fourth surface, and
wherein in the first state, the flexible hinge is seated on the seating portion.

3. The electronic device of claim 2, wherein in the first state, a surface of the flexible hinge that is exposed to the outside is placed on substantially the same plane as the fourth surface.

4. The electronic device of claim 1, wherein the lower plate part further includes, on a partial area thereof, a stopper protruding from the fourth surface in the first direction, and
wherein in the second state, one end of the upper plate part is stopped by the stopper.

5. The electronic device of claim 4, wherein the upper plate part further includes, on a partial area thereof, a depression concavely formed in the first direction from the second surface, and
wherein in first state, the stopper is inserted into the depression.

6. The electronic device of claim 1, wherein the upper plate part includes a third magnetic material disposed inside one end thereof,
wherein the lower plate part includes a fourth magnetic material disposed inside a partial area thereof, and
wherein in the second state, the third magnetic material and the fourth magnetic material are fastened with each other.

7. The electronic device of claim 1, wherein the third material includes at least one of urethane, poly urethane, fabric, or thermoplastic poly urethane.

8. The electronic device of claim 1, wherein at least one of the first magnetic material or the second magnetic material contains neodymium.

9. The electronic device of claim 1, further comprising:
a display seated in the upper plate part and a functional module seated in the lower plate part.

10. The electronic device of claim 1, wherein the second state is changed to a third state when pressure of a specified sixth magnitude or more is applied to a partial area of the flexible hinge,
wherein when the second state is changed to the third state, the first magnetic material and the second magnetic material are unfastened,
wherein in the third state, the upper plate part is mounted on the lower plate part while forming a specified second angle with the lower plate part, and
wherein the second angle is larger than the first angle.

11. The electronic device of claim 9, wherein the functional module includes a keyboard including a space bar area including a space bar used for input of a blank.

12. The electronic device of claim 11, wherein when viewed from above the fourth surface, a glass housing, a touch film, and a light-source display are stacked and disposed inward of the space bar area.

13. The electronic device of claim 12, wherein when a specified key among keys included in the keyboard is selected, the space bar area is set as an area for receiving a gesture input of a user.

14. The electronic device of claim 13, wherein the space bar area is set as an area for input of a blank when the specified key is selected in a state in which the space bar area is set as the area for receiving the gesture input of the user.

15. The electronic device of claim 12, wherein in a state in which a specified key among keys included in the keyboard is pressed, the light-source display displays an object corresponding to at least one shortcut key configured to provide a specified function, and the space bar area is set as an area for selecting the at least one shortcut key, and
wherein when the pressed state of the specified key is released, the light-source display ends the display of the object, and the space bar area is set as an area for input of a blank.

* * * * *